United States Patent [19]
Schobert et al.

[11] 3,950,162
[45] Apr. 13, 1976

[54] REDUCTION TO MANGANESE METAL USING METAL TRANSPORTING COMPOUNDS

[75] Inventors: Harold H. Schobert, Gloucester Point; Roger C. Field, Gloucester; Paul H. Cardwell, Zanoni, all of Va.

[73] Assignee: Deepsea Ventures, Inc., Gloucester Point, Va.

[22] Filed: May 20, 1974

[21] Appl. No.: 471,234

[52] U.S. Cl. ...................... 75/80; 75/135; 423/491; 423/492; 423/592; 423/611; 423/625
[51] Int. Cl.² ......................................... C22B 47/00
[58] Field of Search....... 75/80, 68 B, 135; 423/491, 423/492, 592, 611, 625

[56] References Cited
UNITED STATES PATENTS
3,137,567 6/1964 McGeer............................ 75/80 X

*Primary Examiner*—M. J. Andrews
*Attorney, Agent, or Firm*—Barry G. Magidoff

[57] ABSTRACT

This invention provides a process for obtaining substantially pure manganese metal by the reduction of a manganese oxide or a manganese halide by reaction with a subhalide of a transport metal. The transport metal can be aluminum, silicon, or titanium. In preferred embodiments of this procedure, a continuous closed cycle process is carried out wherein the transport metal value is reconverted to its subhalide and recycled for reaction with additional manganese compound.

51 Claims, 2 Drawing Figures

REDUCTION TO MANGANESE METAL USING METAL TRANSPORTING COMPOUNDS

The art has generally obtained pure masses of manganese metal, industrially, by the reduction of the oxide, or halide, usually the chloride, of manganese. Reduction methods have included electrolytic reduction and chemical reduction methods.

Electrolytic methods, although usually resulting in a highly pure product, are expensive and require the availability of a cheap plentiful source of electrical power. Chemical methods, although often capable of being carried out on a more economical scale and with fewer limitations as to geographical location, often result in the formation of impure alloys of manganese. These alloys, in turn, can only be refined to the pure manganese metal, where such is desired, by relatively expensive procedures utilizing reagents which are themselves expensive and which are not usually fully recoverable. The chemical methods are also difficult to control, often being subject to numerous shut-downs during the course of operation. This results in a loss of the economies associated with a continuously operating process. The required shut-down, and subsequent start-up procedures, are inefficient in requiring an extensive number of man hours.

The art has previously experimented with the use of so-called "chemical transport reactions" to purify a range of metals, to a relatively high degree of purity. In such procedures, generally, an impure source of the metal is reacted with a compound of the same metal in the normal valence state, e.g. $AlCl_3$, to form a vaporous compound in which the metal is in a lower than normal valence state, e.g., $AlCl$. This vaporous low valence state compound is then separated from the impurities by removal to another site where it is readily decomposed to form the pure metal and the normal valence state compound, which can then be readily separated. See, for example, the text *Chemical Transport Reactions*, by Harold Schafer, Academic Press (1964).

Commercial operations have also been attempted; in U.S. Pat. Nos. 2,470,305 and 2,470,306, for the refining of aluminum, by reaction with a source of halide, such as aluminum chloride, cryolite, or even an alkali metal halide or alkaline earth metal halide, to form the vaporous subhalide, which can then be decomposed.

In accordance with the present invention, elemental manganese metal is obtained from either manganese oxide or a manganese halide by an easily controlled reaction utilizing a transportable metal subhalide. In the preferred embodiments, this reaction can be made a part of an easily controlled, closed cycle processing system, wherein the material which reacts directly with the manganese compound can be substantially completely recycled. The only net reagent input to the system, in addition to the manganese compound, is a relatively inexpensive reducing agent, preferably a carbonaceous material, and in one instance, a reagent, water; the water reacts with the normal halide of the transport metal to form hydrogen halide. In addition, the reaction product of the reducing agent can be a valuable heating gas, i.e. carbon monoxide, when utilizing a carbonaceous reducing agent.

The process of the present invention comprises, most broadly, the production of manganese metal by reacting a manganese compound, selected from the group consisting of manganese oxides and manganese halides, with a subhalide of a transport metal selected from the group consisting of aluminum, silicon, and titanium, to form manganese metal and the corresponding normal halide of the transport metal. The manganese metal formed can be in the pure state or alloyed with the transport metal as explained below. A further byproduct of this broad reaction comprises a compound of the transport metal corresponding to the manganese metal compound reacted. This byproduct can be the transport metal oxide, or the transport metal halide corresponding to the manganese halide reacted.

Generally, a closed reaction system can be obtained, in accordance with a preferred embodiment of the present invention, which comprises the further steps of separating the manganese metal from the byproducts and reducing the byproducts back to the subhalides, using, most preferably, a carbonaceous material as the reducing agent. When the manganese raw material is a manganese halide, and the byproduct is thus a corresponding transport metal halide, it is first necessary to convert the transport metal halide to the oxide, preferably using water, and then reduce the oxide to the transport metal. The reaction with water results in the production of a valuable byproduct: a hydrogen halide. The subhalide can be obtained by the reaction of elemental transport metal, in either a pure or impure form, with a normal halide of a transport metal, to form the subhalide. This is in accordance with the well-known chemical transport reaction, for example as disclosed in the text "Chemical Transport Reaction", supra. Although the source of the elemental transport metal can be fresh metal brought into the system, if desired, in another embodiment, a substantially closed cycle system is utilized wherein the transport metal is substantially completely recycled so as to require no continuing net input of transport metal into the system.

In accordance with one of the preferred embodiments of the present invention, a closed cycle system is obtained for the production of pure manganese metal from a manganese oxide, the process comprising:

reacting manganese oxide with a subhalide of a transport metal selected from the group consisting of aluminum, silicon, and titanium, so as to form molten pure manganese metal, a corresponding normal halide of the transport metal, and an oxide of the transport metal;

reducing the oxide of the transport metal to a metallic form of the transport metal; and reacting the metallic form of the transport metal with the normal halide to form the subhalide, and recycling the subhalide to react with additional manganese oxide.

The manganese metal formed in the first step of the above closed cycle process is readily separated from the byproducts, i.e. the normal halide of the transport metal and the oxide of the transport metal, the normal halide being a gas at the reaction temperature and permitting the molten metal to form a pool beneath the reaction system upon which the much lighter transport metal oxide will float. The transfer metal oxide can be readily removed from the surface of the pool and the molten manganese readily tapped from below.

In a second preferred embodiment, for preparing pure manganese metal from a manganese halide, the process comprises:

reacting a manganese halide with a subhalide of a transport metal selected from a group consisting of aluminum, titanium, and silicon, at a temperature below the boiling point of the manganese halide, to form manganese metal, either in the pure state or as an alloy of manganese and the transport metal, and a corresponding normal halide of the transport metal;

reacting the alloy, if one is formed, with a portion of the normal halide at a temperature of at least the melting point of pure manganese metal, or of a higher melting alloy, to form pure molten manganese metal and the subhalide of the transport metal;

converting a portion of the normal halide to the oxide of the transport metal;

reducing the oxide of the transport metal to a metallic form of the transport metal;

reacting the metallic form of the transport metal with yet another portion of the normal halide to form the subhalide of the transport metal, and recycling the subhalide formed above to react with manganese halide.

The basic reaction in accordance with the present invention, i.e. the reaction of the manganese compound with the transport metal subhalide, can be carried out with manganese in substantially any of its valence states, i.e. 2, 3 or 4. The oxides of manganese thus include MnO, $Mn_2O_3$, $Mn_3O_4$, and $MnO_2$. It is preferred, however, to carry out the procedure with the manganese oxide in its lowest valence state, i.e. MnO. Although manganese halides can be utilized wherein the manganese is in its higher valence state, generally only the halides of divalent manganese are stable and available at the conditions for the process. Useful manganese halides thus include $MnF_2$, $MnCl_2$, $MnBr_2$, and $MnI_2$.

The transport metal subhalides which are utilized for reducing the manganese compound to the elemental manganese, include the lowest possible halides of the transport metals, and thus include the halides of aluminum in its monovalent state and the halides of titanium or silicon in their divalent state. The fluorides, chlorides, bromides or iodides of these transport metals can be utilized. It is noted that a mixture of halides can be present such that the aluminum subhalide need not correspond to the manganese halide, e.g. manganese chloride can be reacted with aluminum subiodide or subbromide. Generally, manganese is present as the chloride, as the result of the most conventional metallurgical refining procedures, or as the oxide. However, the other halides can be treated in accordance with this procedure, if they are available. Similarly the preferred subhalide is the chloride, because of its ease of handling and relatively low cost and ready availability. However the other halides can also be utilized where available and desired.

The reaction of the manganese compound with the transport metal subhalide can be carried out at substantially any temperature in the range in which the transport metal subhalide is stable, i.e. at a temperature above that at which the subhalide autogenously disproportionates into the normal halide and an elemental transport metal; however, it is preferred that the reactor be maintained at a temperature at which substantially pure molten manganese metal is obtained, as otherwise an alloy of manganese and the transport metal is formed. This minimum preferred temperature can be higher than the melting point of pure manganese metal, which can melt at as high as about 1,260° C, if a higher melting alloy of the transport metal and manganese is formed. Thus, the preferred minimum reaction temperature for forming the pure molten manganese metal when aluminum is the transport metal, is the melting point of a maximum melting point alloy of aluminum and manganese, i.e. slightly less than about 1300° C. However, when the manganese compound is a chloride, bromide or iodide, the reaction is preferably carried out at a lower temperature, i.e. below that at which substantial vaporization of the manganese halide occurs. When such vaporization occurs, the manganese halide reactant is lost together with the subhalide and the process becomes highly inefficient. For example, the atmospheric sublimation temperature of manganese chloride is about 1100° C. Therefore, it is not practical to react these three manganese halides to directly obtain the manganese as a pure molten metal; rather, the reaction product formed by carrying out the reaction between molten, e.g. manganese chloride, and the subhalide is an alloy of the manganese metal and the transport metal, which can subsequently be further treated to obtain pure manganese. It is generally not advisable to carry out such high-temperature processes under pressure in order to maintain the manganese halide in a non-vaporous state at higher temperatures. Manganese fluoride, on the other hand, has a boiling point of about 2,000° C, and thus can be treated at a temperature above the melting point of manganese metal, without the necessity of forming an alloy.

The alloys of manganese and the transport metal can be obtained by the reaction of a limited amount of the subhalide to form the desired alloy.

The ratio of manganese to transport metal in the alloy which is formed is a function of the temperature at which the transport metal subhalide and manganese halide are reacted and also, to a certain extent, of the proportions of the reagents in the reactor. The alloy should contain at least about 5 percent by wt. manganese ($MnAl_{38}$) and preferably at least about 50 wt. % manganese ($MnAl_2$) and optimally at least about 58 wt. % manganese (MnAl). Thus, one example of the reaction equations for a manganese halide reduction carried out at a temperature below that sufficient to form substantially pure molten manganese would be as follows:

$3MnY_2 + 30AlX \rightarrow 3MnAl_6 + AlY_3 + 10AlX_3$

$14MnY_2 + 26SiX_2 \rightarrow 13SiX_4 + 7SiY_4 + 2Mn_7Si_3$

$4MnY_2 + 16TiX_{20} \rightarrow 8TiX_4 + 2TiY_4 + Mn_4Ti_6$ wherein X and Y are halides, which can be the same or different, including F, Br, Cl, and I.

Where the halide is the fluoride, the following reaction can occur, at the temperatures of above the melting point of manganese metal:

$MnF_2 + AlF \rightarrow Mn + AlF_3$ $MnF_2 + SiF_2 \rightarrow Mn + SiF_4$ $MnF_2 + TiF_2 \rightarrow Mn + TiF_4$ Although the above reaction equations show the halide products as being two distinct aluminum, silicon or titanium compounds, if the halides of manganese and the transport metal are the same, a single product will of course be obtained. However, where the halides are different, not only will the above two halide compounds be formed, but one or more mixed halide compound, e.g. $AlX_nY_{3-n}$, can also be formed. For purposes of simplicity, however, the above compounds are only shown. The ratios of manganese to the transport metal shown in the above equations exemplify those which form a low melting alloy as shown in Constitution of Binary Alloys, by Hansen (McGraw Hill, 1958).

Preferably, therefore, the reduction of the manganese halide is carried out at a temperature of at least the melting point of the manganese halide, e.g. for manganese chloride at least about 650° C, but most preferably not above 750° C, to avoid excessive loss by evaporation of the manganese chloride, manganese iodide or manganese bromide.

The manganese-transport metal alloy can then be treated so as to obtain the pure manganese metal and, further, preferably recycling the transport metal as the subhalide. Thus, for example, the molten manganese-transport metal alloy can be reacted with a normal transport metal halide to form the pure molten manganese metal and the vaporous metal subhalide, which can be readily separated. This reaction is preferably carried out at the temperature sufficient to form substantially pure, molten manganese, as explained above. Temperatures of above about 1,800° C need not be considered for purely practical processing reasons. However temperatures of at least about 1,350° C are preferred. The purifying of the manganese-transport metal alloy can be defined by the following reaction equations:

$$3MnAl_6 + 9AlX_3 \rightarrow 3Mn + 27AlX$$

$$Mn_7Si_3 + 3SiX_4 \rightarrow 7Mn + 6SiX_2$$

$$Mn_4Ti_6 + 6TiX_4 \rightarrow 4Mn + 12TiX_2$$

wherein X represents one or more halides, i.e. F, Cl, Br, or I.

In the process in accordance with the present invention, wherein a manganese oxide or manganese fluoride is reacted, the preferred minimum temperature can be the melting point of pure molten manganese or of the higher melting manganese-transport metal alloy formed, whichever is higher, as there is no danger of the manganese compound being evaporated at such temperatures. Thus the maximum temperature is limited mainly by the economics and the cost of a reaction vessel suitable for use at high temperatures. It is most preferred, however, to operate as close as possible to the melting pint of the manganese metal and generally not above about 1,500° C to avoid excessive difficulties in operating the process. At such temperatures, however, the manganese oxide is not molten and the presence of a suitable flux is required in order to dissolve the manganese oxide in the molten phase. Any suitable flux materials can be utilized which form a molten solution with the manganese oxide at the desired operating temperatures and which are inert in the present process, i.e. do not interfere with the desired reaction between the transport metal subhalide and the manganese oxide, do not themselves react with any of the reagents, and will not interfere with the separation of the pure manganese metal and the normal transport metal halide from the reactor system. It is pointed out at this time that the manganese oxide is often charged not as the oxide per se but as one or more compounds which autogenously decompose to the oxide at the temperatures of the reaction vessel, for example, a manganese carbonate. Thus suitable fluxes include, but are not limited to, those conventionally used in the high temperature metal arts such as the alkali metal fluorides, and alkaline earth metal fluorides. Generally the flux is not used up in the reactor system, such that additional flux need not be added with additional manganese oxide being added. However, where the manganese oxide is not pure, there could be a build-up of impurities mixed with the flux layer. It must be noted further, that in the manganese oxide reducing system there is an accumulation of the transport metal oxide mixed together with the flux. The preferred ratio of flux material to manganese oxide is dependent upon the temperature-composition curve for the particular flux material utilized with the manganese oxide and the transport metal oxide present, and, of course, the minimum amount of flux required to operate at a given temperature is preferably present in the reactors. In carrying out the reduction of the manganese oxide, the following reactions are believed to occur, when manganese oxide is charged to the reactor vessel:

$$3AlX + 3MnO \rightarrow AlX_3 + Al_2O_3 + 3Mn$$

$$2SiX_2 + 2MnO \rightarrow SiX_4 + SiO_2 + 2Mn$$

$$2TiX_2 + 2MnO \rightarrow TiX_4 + TiO_2 + 2Mn$$

In the procedures for reduction of both a manganese halide and a manganese oxide, there is formed in the reaction vessel, a dense layer of metal, either pure molten manganese metal or the manganese-transport metal alloy, forms at the bottom of the vessel. Above this metal level is a molten layer comprising the manganese compound, either the manganese oxide or the manganese halide, and, in the case of the manganese oxide, the flux material as well. In the case of manganese halide, the molten layer should be bled at various times, so as to prevent the excessive build up of impurities in the reactor and, in the case of manganese oxide, to remove the transport metal oxide. The transport metal normal halide byproduct is evolved as a vapor and is thus readily removed from the reactor vessel. The transport metal subhalide is fed to the reactor vessel as a vapor, to a point within the molten oxide or halide layer, so as to ensure contact with the manganese compound as the vapor travels upwardly through the molten material.

In the operation of the preferred continuous procedure, wherein substantially all of the transport metal value is recovered and recycled, it is necessary that the transport metal compound formed as the byproduct from the reduction of the manganese compound to the manganese metal, be reconstituted as the subhalide. The transport metal compound byproduct is a mixture of the transport metal halides corresponding to the transport metal subhalide reagent, plus a transport metal compound corresponding to the manganese compound charged to the reactor. That is, when manganese oxide is charged, the second byproduct compound is the transport metal oxide. When a manganese halide is charged, the byproduct compound is the transport metal halide. In the latter case, only a single compound may, of course, be formed, when the manganese halide corresponds to the transport metal halide.

Generally, the recycle process preferably comprises converting the byproduct compound of the transport metal which corresponds to the manganese compound, e.g. transport metal oxide or transport metal halide, to the elemental transport metal and then reacting that transport metal with the transport metal normal halide recycled from the manganese reduction reaction. In the case of the manganese oxide process, the transport metal oxide which is thus formed is removed from the manganese reduction reactor in admixture with the flux layer and fed to a transport metal oxide reduction reactor to form the elemental transport metal, preferably in the molten state. In a preferred example of this procedure, the transport metal oxide plus flux is reacted with a carbonaceous material to reduce the transport metal oxide to the elemental transport metal and the flux is then recycled back to the manganese reduction reactor.

The carbonaceous materials which can be utilized include pure carbon in any form, coal, carbon black, charcoal, coke, lamp black, as well as graphite. It is of course desirable to use the most economical source of carbon available. Further, hydrocarbon materials can be utilized as the reducing agent, especially such materials as tars and other byproducts from petroleum and coal refining. Other reducing agents can also be used in this process, for example, hydrogen. However, the carbonaceous materials are the most economical and also result in the most easily separated byproduct, which itself has some market value, e.g. carbon monoxide.

In the treatment of the transport metal oxide, which in the case of the manganese oxide process is admixed with flux, the molten oxides are admixed with the carbonaceous material, e.g. carbon, to form, after reaction, a dense layer of the molten transport metal at the bottom of the reactor, an intermediate level which contains the flux, and the gaseous byproduct comprising carbon monoxide when utilizing a carbonaceous reducing agent. The flux can be tapped and returned to the manganese reduction reactor and the molten transport metal can also be removed.

The molten transport metal is then carried to a transport metal reactor, where it is contacted with the transport metal normal halide vapor from the manganese reduction reactor. This procedure must be carried out at a temperature sufficiently high so as to form the transport metal subhalide. It is preferred that oxygen be excluded from the surface of the transport metal when it is being reacted with the transport metal normal halide and thus either a closed pot, to exclude air, can be utilized or a layer of standard commercial melting fluxes, can be utilized to cover the surface of the molten transport metal.

The transport metal normal halide is generally admitted as a vapor which readily reacts with the transport metal at such temperatures. The transport metal is preferably in the molten state and the transport metal halide vapor enters at a level below the surface of the molten metal.

The subhalide thus formed must always be maintained at a temperature above that at which it autogenously changes to form the normal halide and the metallic form of the transport metal. Thus, generally, when operating with aluminum chloride, a 600° C minimum is preferred; when operating with silicon chloride, a temperature of at least about 900° C is preferred, and when the transport metal is titanium, a temperature of at least about 600° C is preferred for the iodide and at least about 1000° C for the chloride.

Aluminum is the preferred transport metal because of the low temperatures at which it reacts in accordance with the process of the present invention. However, in order to successfully utilize aluminum on a commercial scale, one problem must be avoided; it has been found that when aluminum is reduced utilizing a carbonaceous material, the aluminum has a tendency to form a carbide compound, which interferes with the subsequent formation of the transport metal subhalide. Accordingly, in order to avoid the formation of the carbide, or aluminum-carbon alloy, the aluminum can be admixed with another alloy material, e.g. silicon, which prevents the formation of the carbide but which does not itself interfere with the formation of the transport metal subhalide. Thus, the feed to the transport metal oxide reducing reactor can comprise silicon-aluminum alloy as well as the transport metal oxide, e.g. $Al_2O_3$; the molten transport metal phase which forms at the bottom of the transport metal reducing reactor is actually an aluminum-enriched alloy of aluminum and silicon. There is at least about 4% by wt. silicon present in the molten transport metal phase in the transport metal reactor. The maximum amount of silicon which can be present is that which would render the process impractical; generally not more than about 95% by wt. silicon should be present in the molten transport metal reduction reactor mass. In a continuous process, the aluminum-silicon alloy formed in the transport metal reduction reactor is then passed to the transport metal subhalide reactor where it is reacted with the aluminum trichloride ($AlCl_3$) received from the manganese reduction reactor. The silicon does not interfere with or enter into the reaction and thus remains in the transport metal subhalide reactor as an inert mass. The aluminum-poor alloy from the transport metal subhalide reactor, i.e. after at least a portion of the aluminum hass reacted, is removed and returned to the transport metal oxide reducing reactor where it is admixed with fresh aluminum oxide to form a richer aluminum-silicon alloy, which can then be returned to the transport metal subhalide reactor.

In the process for treating manganese halide to obtain the manganese metal or a manganese-transport metal alloy, the byproduct from the reduction reaction is the transport metal normal halide. The transport metal normal halide evolves as a vapor and is removed. In the continuous recycle embodiment of this process, a portion of the vaporous byproduct is separated and, as described above, contacts the manganese-transport metal alloy, where one was formed, to form the pure manganese metal and transport metal subhalide which can then be returned to the manganese reduction reactor. A second portion of the transport metal halide byproduct, corresponding to the amount of the manganese halide which is reacted, is removed and converted to the transport metal oxide. Preferably, the conversion of the transport metal halide is carried out utilizing water. There is preferably charged at least the stoichiometric amount of the water to completely convert the transport metal halide to the transport metal oxide. A valuable byproduct which can be obtained by this reaction of the transport metal halide with water is a hydrogen halide. The transport metal oxide which is thus formed is then passed to the transport metal reducing reactor to form the transport metal and then the transport metal is reacted with a third portion of the transport metal halide byproduct to form the transport metal subhalide which can then be recycled to the manganese halide reduction reactor.

The reactions for the formation of the transport metal oxides, from the transport metal halides, are as follows:

$$2AlX_3 + 3H_2O \rightarrow 6HX + Al_2O_3$$

$$MX_4 + 2H_2O \rightarrow 4HX + MO_2$$

wherein X is one or more halide group and M is titanium or silicon.

The preferred process for reducing the transport metal oxide to the elemental transport metal utilizing a carbonaceous material can be represented by the following equations:

$$MO_2 + 2C \rightarrow M + 2CO$$

$$Al_2O_3 + 3C \rightarrow 2Al + 3Co$$

As explained above, in the case of utilizing aluminum as a transport metal, it is preferred that elemental silicon be present in the transport metal reducing reactor in order to prevent the formation of the undesirable aluminum carbides, or aluminum-carbon alloys.

The process in the transport metal subhalide reactor can be represented as follows:

$$M + MX_4 \rightarrow 2MX_2$$

$$2Al + AlX_3 \rightarrow 3AlX$$

The above reactions are written for reducing manganous oxide. In actual practice it is believed that any of the various higher oxides of manganese present will be reduced to the lowest oxide under the conditions of the reaction, prior to reaction with the transport metal subhalide.

In the accompanying drawings, examples of certain advantageous embodiments of the procedure in accordance with the present invention are set forth, wherein.

In the drawings, and in the following description of the process, the elements of the apparatus are shown and described in highly simplified form, and generally in an essentially symbolic manner. Appropriate structural details for actual operation are readily known and understood and need not be set forth herein, as they are not part of the present invention. Generally, all process vessels and fluid conduits are made or lined with substances suitably resistant to the various materials present therein, whether as gases, molten liquids or solids. The materials of construction or the linings thereof have appropriate thermal or other insulating properties where necessary; thus refractory materials are ordinarily contemplated for the interior of most of the vessels and fluid conduits, piping systems, defined below.

Figure 1:
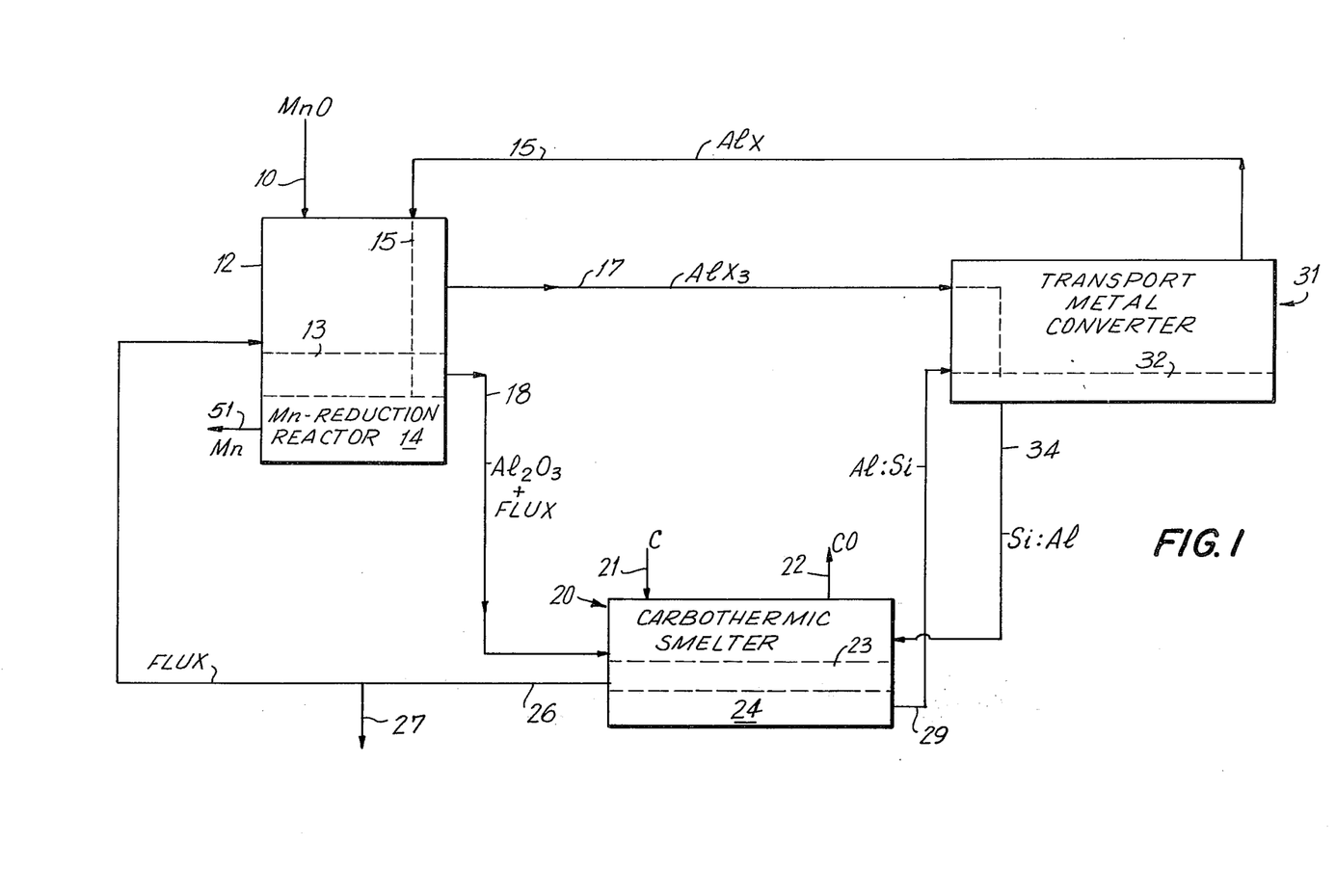
FIG. 1 is a schematic view, of a flow diagram, of a system for obtaining molten manganese metal from manganese oxide.

Referring to FIG. 1, a preferably granulated or particulate manganese oxide, in this case exemplified as MnO, is charged via conduit 10 to the manganese reduction reactor 12. The reactor contains a heterogenous layer of liquid, the top layer of liquid 13, comprising the manganese oxide, and a liquifying flux therefor, and the transport metal oxide, in this case exemplified by aluminum. The lower layer 14 comprises substantially pure molten manganese metal. The aluminum monohalide, is fed to a point beneath the top surface of the molten liquid flux via conduit 15. The products formed by the reaction (aluminum oxide, manganese metal and aluminum trihalide) are removed from the reduction reactor 12 as follows: the aluminum trihalide is removed overhead as a vapor via line 17 and the molten manganese metal product is tapped continuously or intermittently by means conventional to the art and removed via line 51. The aluminum oxide by-product is tapped with the molten liquid 13 and removed via line 18 in combination with the flux material. The combined transport metal oxide and flux are carried via line 18 to the transport metal reducing reactor, which in this case is a conventional carbothermic smelting furnace 20. Carbonaceous material is fed via line 21 and the carbon monoxide product is removed overhead as a vapor via line 22. Within the carbothermic smelter 20, a heterogeneous liquid phase is formed comprising an upper layer of molten flux and aluminum oxide 23 and a lower mass of molten metal 24. The carbothermic smelter 20 is maintained preferably at a temperature of at least about 2,000° C and preferably at a temperature of about 2,100° C. There is at least a stoichiometric amount of carbonaceous material added to the carbothermic smelter to reduce all of the aluminum oxide fed thereto. As shown, the flux material is removed from the upper liquid phase 23 via conduit 26 and returned to the manganese reduction reactor 12. A portion of the molten flux material passing through conduit 26 can be tapped and bled off via line 27 so as to prevent the build up of any undesirable impurities which may have been fed into the system together with the manganese oxide or together with the carbonaceous material. The molten transport metal is removed from the bottom of the carbothermic smelter via conduit 29.

As explained above, when utilizing aluminum, the aluminum is preferably present as an alloy together with silicon. The silicon does not enter into the reaction, but prevents the formation of aluminum carbide, which can interfere with the next step of the reaction procedure. As shown, an aluminum-rich silicon alloy is removed from the carbothermic smelter via conduit 29 which contains at least about 50% aluminum and preferably at least about 80% aluminum, by wt. In an optimum embodiment, there is at least about 90% aluminum in the molten metal passing through the line 29. This aluminum-rich alloy is fed via line 29 to the transport metal converter 31 where it is admixed with the aluminum halide fed thereto via line 17. The aluminum halide is fed as a vapor and preferably is fed to a point below the level of a liquid phase of molten metal in the bottom of the converter 31. The aluminum monohalide product from the converter is removed overhead therefrom via line 15 and is returned to the manganese oxide reducing reactor 12 for a further reaction with manganese oxide. An aluminum-poor alloy is removed from the converter 31 via line 34 and returned to the carbothermic smelter 20. The transport metal subhalide converter is preferably maintained at a temperature of at least about 950° C, preferably at least about 1,100° C, and optimally at a temperature of about 1,150° C. The converter is preferably maintained so as to exclude all oxygen from the interior of the system thus preventing oxidative interference with the formation of the subhalide. If desired, a layer of standard commercial melting fluxes can be used above the molten metal to act as a blanket for further ensuring against contamination by oxygen. When silicon is utilized as a transport metal, the transport metal subhalide converter should be maintained at a temperature of at least about 1,400° C and for titanium a temperature of at least about 1,800° C, i.e. the melting point for each of these metals respectively.

The manganese reduction reactor 12 is preferably maintained at a temperature of at least about 1,260° C, i.e. the melting point of manganese metal; most preferably at a temperature in the range of from about 1,325° C to about 1,425° C, and optimally at a temperature of around 1,350° C. When utilizing, for example, a flux comprising calcium fluoride and the manganese oxide MnO, an MnO-to-flux weight ratio of, for example, 1.5 is satisfactory.

Figure 2:
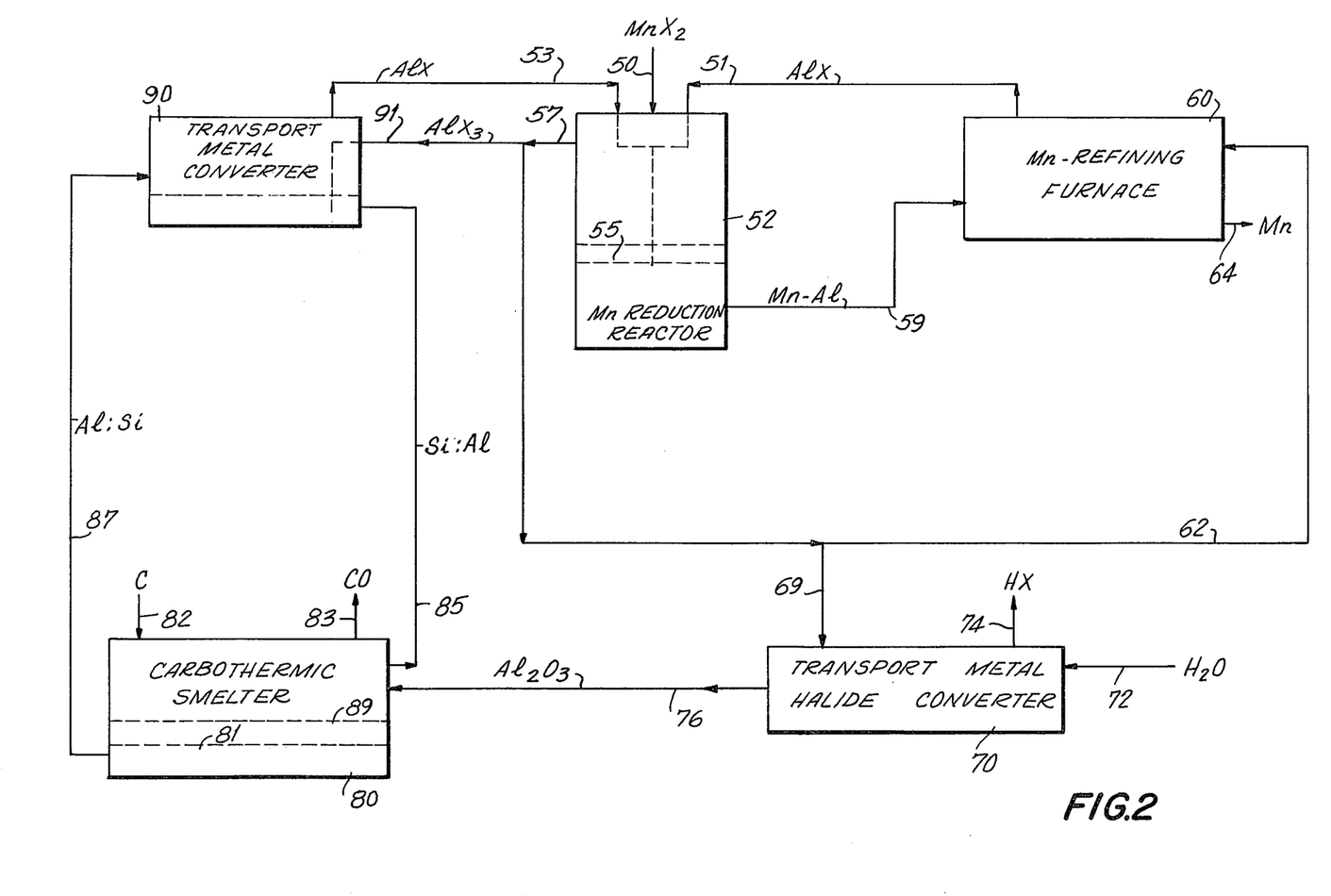
FIG. 2 is a schematic view, of a flow diagram, of a system for obtaining molten manganese metal from manganese halide.

Now, referring to FIG. 2, a manganese halide is fed via line 50 into the manganese reduction reactor 52, while a transport metal subhalide, in this case aluminum monohalide, is fed via conduits 51 and 53 into the reactor vessel 52. The temperature in the reactor vessel 52 is below the melting point of pure manganese metal and the proportion of the transport metal subhalide-to-the manganese halide is sufficient to produce in the reactor vessel 52, a manganese-aluminum alloy metal phase 55. A layer of molten manganese halide is present above the metal phase. The vaporous transport metal subhalide is fed to a point within the manganese halide layer. In this reactor vessel the reaction which is occurring is that between the manganese halide and the aluminum subhalide to form manganese-aluminum alloy and aluminum trihalide. The aluminum trihalide byproduct is removed overhead as a vapor via conduit 57 and the manganese-aluminum alloy is continuously or intermittently removed via conduit 59. The manganese-aluminum alloy is fed via line 59 to a manganese refining furnace 60 where it is contacted with a portion of the transport metal normal halide, aluminum trihalide, removed via conduit 57 and carried to the furnace 60 via conduit 62. Pure manganese metal is removed in a molten state via conduit 64 and vaporous transport metal subhalide, aluminum monohalide, is removed overhead and returned to the manganese reduction reactor via line 51.

The manganese halide reduction reactor 52 is preferably maintained at a temperature of at least about 650° C when the manganese halide is the bromide, chloride or iodide, with a maximum temperature preferably not above about 850° C and most preferably not above 750° C. An optimum temperature for the above three halides is about 660° C. When the fluoride compounds are utilized, it is preferred that both the manganese and the aluminum compounds be the fluorides, in which case the process can be carried out at a higher temperature because of the relatively high boiling point, i.e. low vapor pressure, of the manganous fluoride compound. Indeed, when operating with the fluorides, it is preferred to operate at a temperature of at least 1,260° C, in which case the manganese-transport metal alloy is not formed, as explained above. Although generally mixtures of halides can be utilized, it is preferred that if the aluminum fluoride is utilized, that the manganese raw material also be the fluoride compound.

The manganese refining furance 60 is preferably maintained at a minimum temperature of at least about 1,300° C, the melting point of the manganese-aluminum alloy. Preferably, it is maintained at a temperature of at least about 1,350° C, and optimally at a temperature of around 1,500° C. A flux material can be utilized to serve as an additional blanket for protecting the molten metal from oxidation.

A second portion of the transport metal normal halide, aluminum trihalide, removed via line 57, is charged to the transport metal halide convertor reactor 70 via line 69. The transport metal halide is reacted with a reagent, in this case exemplified by water, to form the desired transport metal oxide, e.g. $Al_2O_3$, and as a byproduct the corresponding hydrogen halide (HX). The transport metal halide oxidizing reactor 70 is maintained at a temperature of at least about 125° C, and preferably of at least about 200° C, the optimum temperature being around 250° C. Preferably, a stoichiometric amount of the oxidizing agent, e.g. water, is contacted with the transport metal trihalide to form the oxide.

The aluminum oxide is transported via line 76 to a carbothermic smelter 80 similar to that described above in FIG. 1.

A carbonaceous material, for example coke, is fed to the carbothermic smelter 80 via line 82 and a byproduct carbon monoxide is removed overhead via line 83. As above, in the example shown herein, a silicon-aluminum alloy is fed via line 85 into the carbothermic smelter 80; the silicon-aluminum alloy is relatively poor in aluminum. In the carbothermic smelter 80, the alloy from line 85 is admixed with fresh aluminum formed by the reaction between the aluminum oxide and the carbonaceous material to form a richer aluminum-silicon alloy as a molten phase 81 in the smelter, which is then tapped and removed via conduit 87. If desired, a blanket of a flux material can be formed as an oxidation protector over the aluminum silicon alloy in the carbothermic smelter 80 as a heterogenous molten phase 89. Such flux however is not necessary and contrary to what is shown in FIG. 1 above, there is no need to recycle the flux in this instance. The aluminum-silicon alloy, rich in aluminum, is transported via conduit 87 to the transport metal subhalide converter 90, where it is reacted with the third portion of the transport metal normal halide from the conduit 57, in the same manner as explained above in FIG. 1. The aluminum subhalide is then removed overhead as a vapor via conduit 53 and recycled to the manganese halide reduction reactor 52.

In the process described in FIG. 2 above, care must be taken to ensure that the transport metal normal halide, removed as a vapor from the manganese halide reduction reactor 52, is distributed in the proper proportions to the manganese refining furnace 60 (to react with the manganese-aluminum alloy) to the transport metal halide converter reactor 70 (to form sufficient aluminum oxide to be converted to aluminum metal) and to the subhalide converter 90, where it reacts with the aluminum metal made from the second portion of the aluminum halide. These proportions will vary depending upon the ratio of manganese-to-aluminum in the alloy phase removed from the manganese reducing reactor 52. For example, if the manganese alloy is a 50% manganese, 50% aluminum by weight alloy, i.e. $MnAl_2$, one-half of the effluent aluminum halide in line 57 should be fed to the manganese refining furnace 60 via line 62. Of the remaining 50 percent of the effluent from conduit 57, one-third is passed directly to the converter 90 and two-thirds are converted to the aluminum metal via the halide converter reactor 70 and the carbothermic smelter 80. Accordingly, 50 percent of the transport metal normal halide is passed via conduit 62 into the refining furnace 60, one-third is passed into the aluminum halide converter reactor 70 and one- sixth is passed directly into the subhalide converter 90 via conduit 91.

The overall reactions can be exemplified by the following:

$$3MnCl_2 + 12AlCl \rightarrow 6AlCl_3 + 3MnAl_2$$

$$3MnAl_2 + 3AlCl_3 \rightarrow 3Mn + 9AlCl$$

$$2AlCl_3 + 3H_2O \rightarrow Al_2O_3 + 6HCl$$

$$Al_2O_3 + 3C + XSi \rightarrow Si_xAl_2 + 3CO$$

$$Si_xAl_2 + AlCl_3 \rightarrow 3AlCl + XSi$$

When carrying out the process wherein manganese fluoride is reacted to form manganese metal, the manganese halide reduction reactor 52 is preferably maintained at a temperature above the melting point of manganese metal, or of the higher melting alloy, for example at a temperature of about 1350° C. Pure molten manganese metal is thus formed directly as the reaction product. Further treatment to separate out, e.g. aluminum, metal is unnecessary. Accordingly, the manganese refining furnace 60 is not needed in this system. The transport metal normal fluoride removed overhead is thus divided into only two portions: one-third is passed to the subhalide converter 90 for regeneration of the transport metal subfluoride by reaction with transport metal and two-thirds of the total transport metal normal fluoride is available for other uses.

Following are examples of tests which illustrate the operations of the process in accordance with the present invention. They are merely exemplary of the various process steps which can be carried out within the scope of the invention and are not intended nor are they to be taken as exclusive thereof.

EXAMPLE I

A manganese oxide ($Mn_2O_3$), substantially free from other ingredients, is to be reduced to molten manganese. A silicon carbide, Number 6 crucible, is charged with a mixture comprising 750 grams manganese oxide ($Mn_2O_3$) and 600 grams flux, i.e. fluorspar. This crucible is to be the manganese oxide reduction reactor. An identical crucible is charged with 870 grams of granulated aluminum-silicon alloy (90 weight percent aluminum, 10 weight percent silicon). This second crucible comprises the transport metal subhalide converter. Stainless steel piping link the two crucibles as shown in the drawing of FIG. 1. A stainless steel tubing extends overhead from the converter, and is connected to a ceramic tube extending down below the upper level of the manganese oxide in the reactor. All of the process piping described hereinafter connecting high-temperature reactor vessels are heated by open gas burners along their entire length. Each of the crucibles and the other high-temperature reactor vessels described herein are heated in gas furnaces.

A stainless steel container immersed in a potassium nitrate-calcium nitrate eutectic mixture, was utilized for the generation of aluminum trichloride gas and was charged with 380 grams of aluminum trichloride. This steel container (aluminum trichloride generator) was used in place of the recycling system described above for FIG. 1, between the manganese oxide reduction reactor and the subhalide converter. The aluminum trichloride generator was connected via overhead stainless steel piping which is connected to a ceramic tube extending into the subhalide converter to a point below the level of the aluminum-silicon alloy. The aluminum trichloride generated in the manganese reduction reactor was removed overhead via heated stainless steel piping and condensed into a 55-gallon drum.

When all of the crucibles and the generator have been charged and connected, the reactors were sealed with highalumina castable refractory cement. The manganese oxide reduction reactor (the first crucible) was initially heated to its operating temperature of about 1,300° C. The transport metal subhalide converter was next heated until it reaches approximately 1,000° C and the eutectic salt mixture around the steel container was lastly heated so as to reach an operating temperature of approximately 250° C, at which point the aluminum trichloride was evaporated and passes into the subhalide converter. This point marked the beginning of the operation of the system. The aluminum chloride gas was permitted to flow for 0.5 hours, after which time the gas generator was cooled to stop the flow of the aluminum chloride gas to the converter. Once the aluminum chloride flow had been halted, the manganese oxide reduction reactor and the subhalide converter were cooled and the contents of each of the vessels permitted to solidify. The seals on the reactor vessels were then broken and the solidified contents of each removed. Examination of the manganese oxide reduction reactor revealed a slag upper layer composed of flux, aluminum oxide (which was produced in the reaction), and some unreacted manganese oxide; and an ingot of elemental pure manganese metal at the bottom. The above reaction, resulted in the transportation by subhalide transport of 95 grams of aluminum and the production of 175 grams of elemental manganese. The percent of the charge reduced was thus 33 percent and the efficiency of reduction was 91 percent.

EXAMPLE II

Elemental manganese metal is obtained by the reduction of manganese chloride with an aluminum subhalide. In the following test it is again simpler to utilize a separate generator for the aluminum trichloride gas rather than recycling the gas from the manganese halide reduction reactor to the subhalide converter as explained above. In order to exemplify the complete operation of the manganese halide reduction process, the procedure is divided into two separate systems. In the first system, the manganese halide is refined to form a manganese-aluminum alloy; in the second system, the manganese-aluminum alloy is further refined to obtain pure manganese.

A. In the manganese chloride reduction system, a Number 6 silicon carbide crucible was charged with about 3,000 grams of granulated aluminum-silicon alloy (90 weight percent aluminum, 10 weight percent silicon). A number 70 silicon carbide crucible was charged with approximately 9.5 Kilograms (Kg) of anhydrous $MnCl_2$, manganous chloride. A generator for the production of gaseous aluminum trichloride, identical to the one described above in Example I, was also provided, containing 1,300 grams of aluminum trichloride. As before, in Example I, the piping connecting the various reactor vessels was formed of stainless steel and ceramic tubing, and heated as described above. The manganese chloride reduction reactor had an overhead piping connection to a 55-gallon drum condenser and was connected to the subhalide converter via piping connected overhead to the converter unit and extending below the level of the manganese chloride in the reducing reactor. The aluminum chloride generator was connected by piping to the subhalide converter at a point below the top level of the aluminum-silicon alloy. The various reactor vessels were brought to temperature in the following order: first, the manganese chloride reduction reactor was heated to a temperature of 660° C, second, the aluminum alloy subhalide converter was heated to its operating temperature of 1,150° C, and third, the aluminum trichloride generator was heated to a temperature of about 250° C. The time of operation, as explained above, is measured beginning with the generation of the aluminum trichloride. The reverse order of cooling at the end of the experimental run is carried out by first cooling the aluminum trichloride generator so as to halt the flow of aluminum trichloride gas therefrom and then the other reactor units are cooled and the material therein permitted to solidify. The seals of the reactor vessels are broken and visual inspection of the contents of the manganese chloride reduction reactor reveals a layer of manganese-aluminum alloy at the bottom layer covered by a thin layer of unreacted manganese chloride.

Operating the above system for one-half hour, 11.5% of the $MnCl_2$ was reduced resulting in the formation of 1,200 grams of the manganese-aluminum alloy having a composition 29% by weight manganese, 71% by weight aluminum.

B. The second system comprised an aluminum trichloride gas generator as described above and a manganese alloy refining reactor prepared from a piece of nominal 2-inch sealed pipe, about 3 inches long. The reactor was heated in an electric furnace. Stainless steel piping was connected from the upper portion of the aluminum trichloride gas generator to a ceramic tube leading from the top of the manganese alloy refining furnace to below the level of the manganese alloy. The piping was heated by electrical heating tape wrapped around the exterior surfaces.

The manganese alloy refining reactor is further connected by heated steel piping to a condenser for the collection of the aluminum trichloride which is generated.

Approximately 210 grams of the manganese-aluminum alloy described above were placed in the refining reactor and approximately 1800 grams of aluminum trichloride in the gas generator. The manganese refining reactor was first brought to a temperature of about 1,350° C, following which the aluminum trichloride furnace was heated to about 250° C to begin the generation of the aluminum trichloride vapor. The time of operation was measured as commencing with the beginning of the evolution of aluminum trichloride gas. At the end of the test, the aluminum trichloride gas flow was halted by cooling the gas generator and the temperature of the alloy refining reactor was then reduced so as to permit the reactor to cool and the contents therein to solidify. The refining reactor contained a 52 gram ingot of substantially pure manganese after 18 hours of operation, i.e. composition 99.5% Mn. There was about 400 grams aluminum trichloride remaining in the gas generator at the end of the test.

EXAMPLE III

A manganese fluoride reduction system is prepared identical to that in Example II A, except that the crucible is charged with about 9 Kg of anhydrous manganous fluoride and aluminum trifluoride is substituted for the aluminum trichloride in the generator. The manganese fluoride reduction reactor is initially heated to about 1300° C and the subhalide converter to about 1000° C before the aluminum fluoride generator is heated to vaporize the aluminum fluoride.

Following cooling and shutting down of the process, the reactor vessels are opened and an ingot of manganese metal is found in the reduction reactor.

The above examples thus exemplify the operation of a process carried out in accordance with the present invention. It must be understood that the invention as described and exemplified above is not limited to the particular forms and parameters for the procedures described. Many changes are contemplated and can be carried out within the scope of what is known by persons in this field, and many such changes may be made without departing from the scope of the present invention.

The embodiments of this invention which are claimed are as follows:

1. A process for the production of manganese metal comprising reacting a manganese compound, selected from the group consisting of manganese oxides and manganese halides, with a subhalide of a transport metal said transport metal being silicon, to form manganese metal and a normal halide of the transport metal.

2. A process in accordance with claim 1, wherein the manganese compound is a manganese oxide and wherein there is also formed an oxide of the transport metal.

3. A process in accordance with claim 1, wherein the reaction is carried out at a temperature sufficient to form substantially pure molten manganese metal.

4. A process in accordance with claim 1 comprising, in addition, initially forming the subhalide by reacting a normal halide of the transport metal with the transport metal to form vaporous transport metal subhalide which is contacted with the manganese compound.

5. A process in accordance with claim 4, wherein the transport metal normal fluoride is a vapor, comprising in addition separating the vaporous transport metal normal fluoride from the manganese metal.

6. A process in accordance with claim 1, wherein the manganese compound is a manganese halide.

7. A process in accordance with claim 6, wherein the halides are all chlorides.

8. The process of claim 6, wherein the process is carried out at a temperature below that sufficient to form molten manganese metal so that the manganese metal is formed as an alloy with the transport metal.

9. A process for the production of manganese metal comprising reacting a manganese oxide with a subhalide of a transport metal selected from the group consisting of aluminum, silicon and titanium to form manganese metal, an oxide of the transport metal, and the normal halide of the transport metal.

10. A process in accordance with claim 9 wherein the reaction is carried out at a temperature sufficient to form substantially pure molten manganese metal and the transport metal is aluminum.

11. The process of claim 9, wherein the transport metal is aluminum.

12. A process in accordance with claim 11, wherein the transport metal subhalide is aluminum monochloride.

13. A process for the production of manganese metal comprising reacting a manganese halide with a subhalide of aluminum as a transport metal, at a temperature sufficient to form as the reaction product an alloy of manganese with aluminum, and treating the aluminum-manganese alloy at a temperature of at least about 1300° C., sufficient to form pure molten manganese metal, with a normal halide of aluminum so as to form vaporous aluminum subhalide and separating the vaporous aluminum subhalide so as to obtain substantially pure manganese metal.

14. The process of claim 13, wherein the halides are all chlorides and wherein the process is carried out at a temperature of not greater than about 750° C.

15. A process for the production of manganese metal, comprising:
 a. reacting a manganese compound, selected from the group consisting of manganese oxides and manganese halides, with a subhalide of a transport metal, selected from the group consisting of silicon, and titanium, to form manganese metal and, as byproducts, the normal halide of the transport metal and a compound of the transport metal selected from the group consisting of the transport metal oxides and the transport metal halides;
 b. separating the byproducts from the manganese metal;
 c. converting at least a portion of the byproducts so as to form the subhalide of the transport metal; and
 d. recycling the thus formed subhalide to react with a manganese compound.

16. A process for the production of manganese metal comprising: a) reacting a manganese oxide with a subhalide of a transport metal, selected from the group consisting of aluminum, silicon, and titanium, so as to form molten manganese metal, an oxide of the transport metal, and a corresponding normal halide of the transport metal; b) reducing the oxide of the transport metal to a metallic form of the transport metal; c) reacting the metallic form of the transport metal with the normal halide of the transport metal to form the subhalide of the transport metal; and d) recycling the subhalide to react with a manganese oxide.

17. The process of claim 16, wherein the transport metal subhalide is aluminum monochloride.

18. The process of claim 16, wherein the reaction with the manganese oxide is carried out at a temperature at least sufficient to form substantially pure molten manganese metal.

19. The process of claim 16, wherein the oxide of the transport metal is reduced in the presence of a carbonaceous material.

20. The process of claim 19, wherein the transport metal is aluminum and wherein elemental silicon is present when the oxide of the transport metal is reduced by the carbonaceous material.

21. The process of claim 16, wherein the manganese oxide is in a molten phase when it is reacted with the subhalide.

22. The process of claim 21, wherein the manganese oxide is admixed with a flux.

23. The process of claim 19, wherein the transport metal oxide is reduced at a temperature of at least about 950° C.

24. The process of claim 16, wherein the transport metal is aluminum.

25. The process of claim 16, wherein the transport metal subhalide is aluminum monofluoride.

26. A process for the production of manganese metal comprising: a) reacting a manganese halide with a sub-halide of a transport metal, selected from the group consisting of aluminum, titanium, and silicon, at a temperature below the boiling point of the manganese halide, to form an alloy of manganese and the transport metal, and a normal halide of the transport metal; b) reacting the alloy with a portion, number one, of the normal halide of the transport metal at a temperature at least sufficient to form substantially pure molten manganese metal and the subhalide of the transport metal; c) converting another portion, number two, of the normal halide of the transport metal to form an oxide of the transport metal; d) reducing the oxide of the transport metal to a metallic form of the transport metal; e) reacting the metallic form of the transport metal with still another portion, number three, of the normal halide of the transport metal to form the subhalide of the transport metal; and f) recycling the subhalide formed in the steps b) and e) to react with manganese halide.

27. The process of claim 26, wherein the manganese halide is a manganese chloride.

28. A process in accordance with claim 27, wherein the transport metal subhalide is a subchloride.

29. The process of claim 28, wherein the transport metal subhalide is aluminum monochloride and wherein the normal halide is aluminum trichloride.

30. The process of claim 26, wherein the manganese halide is reacted with the subhalide of the transport metal at a temperature not in excess of about 750° C.

31. The process of claim 26, wherein the portion of the normal halide of the transport metal is converted to the oxide by reaction with water.

32. The process of claim 26, wherein the oxide of the transport metal is reduced to the metallic form of the transport metal by reaction with a carbonaceous material.

33. The process of claim 32, wherein the transport metal is aluminum and wherein the oxide of the transport metal is contacted with the carbonaceous material in the presence of another inert molten metal, whereby formation of an aluminum carbide is reduced or substantially eliminated.

34. The process of claim 33, wherein the other molten metal is silicon and the metallic form of the transport metal is an alloy of aluminum and silicon.

35. The process of claim 34, wherein the reaction between an aluminum-silicon metal alloy, which is rich in aluminum, with the normal halide of the transport metal, forms the aluminum monohalide and a silicon alloy partly depleted in aluminum, and the process comprising in addition recycling the silicon alloy, partly depleted in aluminum, so as to present during the reduction of the oxide of aluminum, whereby the alloy is enriched in aluminum.

36. The process of claim 26, wherein the proportion of manganese in the manganese-transport metal alloy is not less that about 5% manganese by weight.

37. A process for the production of manganese metal comprising: reacting manganese fluoride with a subfluoride of a transport metal, selected from the group consisting of aluminum, titanium, and silicon, at a temperature below the boiling point of the manganese fluoride, to form substantially pure molten manganese metal, and a normal fluoride of the transport metal; and reacting a metallic form of the transport metal with a portion of the normal fluoride of the transport metal to form the subfluoride of the transport metal; and passing the subfluoride thus formed to react with manganese fluoride.

38. A process in accordance with claim 37, wherein the transport metal is aluminum.

39. A process for the production of manganese metal comprising reacting a manganese compound selected from the group consisting of manganese oxides and manganese halides, with a subhalide of a transport metal said transport metal being titanium, to form manganese metal and a normal halide of the transport metal.

40. The process for the production of manganese metal comprising reacting a manganese fluoride with a subhalide of aluminum, as the transport metal, to form substantially pure manganese metal and a normal fluoride of the transport metal, the temperature of the reaction being sufficient to form substantially pure, molten manganese metal.

41. A process for the production of manganese metal, comprising:
  a. reacting manganese oxide with a subhalide of a transport metal, selected from the group consisting of aluminum, silicon, and titanium, to form manganese metal and, as byproducts, the normal halide of the transport metal and the transport metal oxide;
  b. separating the byproducts from the manganese metal;
  c. converting the transport metal normal halide byproduct so as to form the subhalide of the transport metal; and
  d. recycling the thus formed subhalide to react with manganese oxide.

42. The process of claim 41, wherein the reaction with the manganese oxide is carried out at a temperature at least sufficient to form substantially pure molten manganese metal.

43. The process of claim 42, wherein the transport metal subhalide is aluminum monochloride.

44. The process of claim 41, wherein the manganese oxide is in a molten phase when it is reacted with the subhalide.

45. The process of claim 44, wherein the manganese oxide is admixed with a flux.

46. The process of claim 42, wherein the transport metal is aluminum.

47. The process of claim 46, wherein the transport metal subhalide is aluminum monofluoride.

48. A process for the production of manganese metal, comprising:
  a. reacting a manganese halide with a subhalide of a transport metal, selected from the group consisting of silicon, and titanium, to form manganese metal and, as a byproduct, a normal halide of the transport metal;
  b. separating the byproduct from the manganese metal;
  c. converting at least a portion of the byproduct so as to form the subhalide of the transport metal; and
  d. recycling the thus formed subhalide to react with the manganese halide.

49. The process of claim 49, wherein the manganese halide is a manganese chloride.

50. A process in accordance with claim 49, wherein the transport metal subhalide is a subchloride.

51. A process for the production of manganese metal, comprising:
  a. reacting a manganese fluoride with a subhalide of aluminum, as a transport metal, to form manganese metal and, as a byproduct, a normal fluoride of aluminum;
  b. separating the byproduct from the manganese metal;
  c. converting at least a portion of the byproduct so as to form the subhalide of aluminum; and
  d. recycling the thus formed subhalide to react with the manganese fluoride.

\* \* \* \* \*

UNITED STATES PATENT AND TRADEMARK OFFICE
CERTIFICATE OF CORRECTION

PATENT NO. : 3,950,162
DATED : April 13, 1976
INVENTOR(S) : HAROLD H. SCHOBERT, ET AL.

It is certified that error appears in the above-identified patent and that said Letters Patent are hereby corrected as shown below:

Column 18, line 52, (Claim 35, line 7), insert immediately preceding the word " present " the following:-- be --.

Column 20, line 23, (Claim 49, line 1), change " 49 " to -- 48 --.

Signed and Sealed this

Twenty-seventh Day of July 1976

[SEAL]

Attest:

RUTH C. MASON
Attesting Officer

C. MARSHALL DANN
Commissioner of Patents and Trademarks